Feb. 25, 1936.  P. HAAS  2,031,646
MOUNTING FOR LIGHT SENSITIVE DEVICES
Filed May 11, 1935
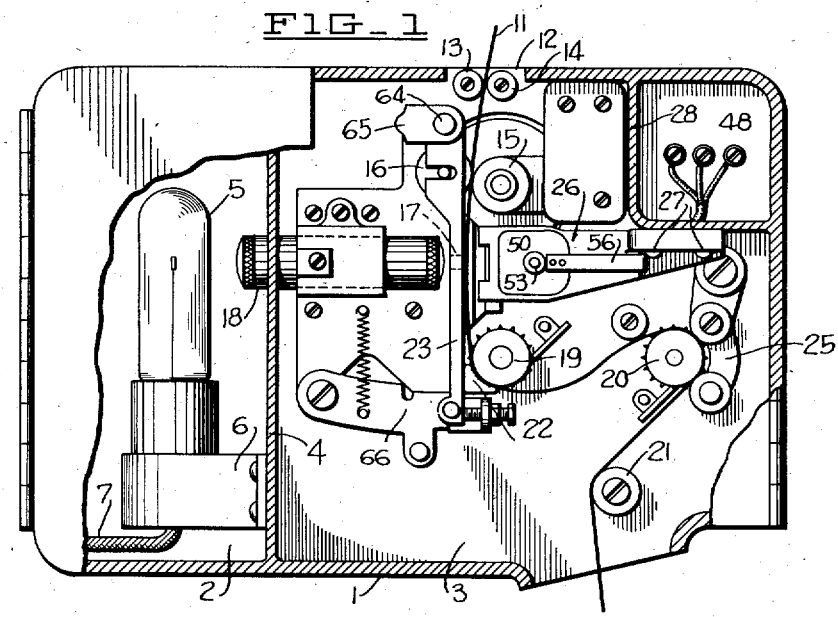
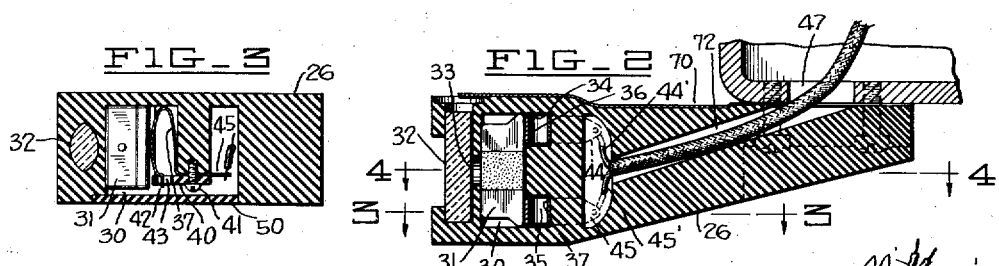
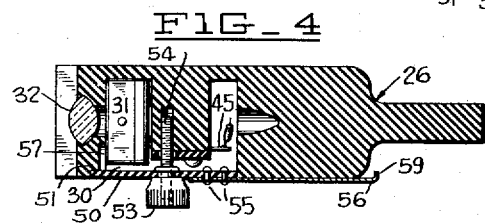
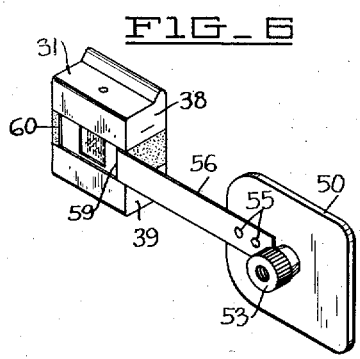
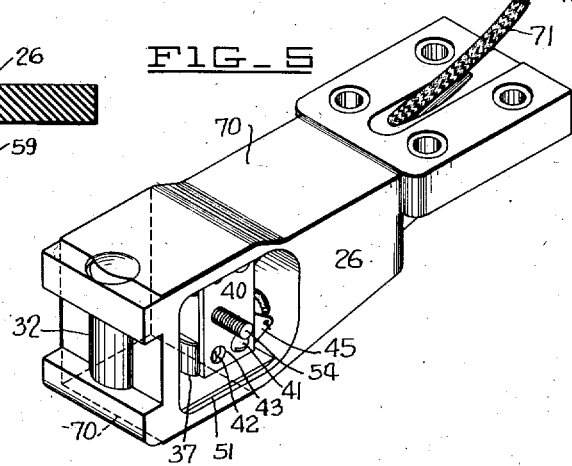
INVENTOR
Paul Haas
BY
ATTORNEY Patented Feb. 25, 1936

2,031,646

UNITED STATES PATENT OFFICE 2,031,646

MOUNTING FOR LIGHT SENSITIVE DEVICES

Paul Haas, Maspeth, N. Y., assignor to United Research Corporation, Long Island City, N. Y., a corporation of Delaware Application May 11, 1935, Serial No. 20,957

14 Claims. (Cl. 179—100.3)

This invention relates to sound reproducing apparatus and particularly to the construction of a holder or bracket for a light sensitive element, such as a selenium cell.

In the reproduction of sound from recordings such as those made on a motion picture film, it is common practice to pass a constant intensity light through the film at a point traversed by the sound track portion of the film, the emergent light from the film being impressed upon a light sensitive device in either the form of a photoelectric cell or a selenium cell. The present invention relates to the mounting for a selenium cell element which provides for positioning the cell at its optimum location with respect to the light emerging from the film, and also a means for permitting the cell to be easily removed and replaced in case of cell deterioration or other faults found during operation. Connections to the cell are made through novel spring contacts which also function to prevent the cell from vibrating in its holder.

The present cell holder also serves as a mounting for a lens which distributes the light from the film over the cell, the lens and cell being maintained in a predetermined optical alignment at all times. The holder also lends itself to a simple means for shielding the cell against static charges which would ordinarily be built up thereon by the action of the film through the reproducing mechanism.

The invention will be more fully understood by reference to the following description read in conjunction with the accompanying drawing, in which Fig. 1 is an elevational view, partly in section, of a sound reproducing head such as is employed in motion picture projectors and involving the present invention.

Fig. 2 is a sectional elevational view of a preferred form of light cell holder.

Fig. 3 is a sectional plan view taken along the line 3—3 of Fig. 2.

Fig. 4 is a sectional plan view taken along the line 4—4 of Fig. 2.

Fig. 5 is a perspective view of the cell holder showing a static shield.

Fig. 6 is a view showing the method of removing the light cell from the holder.

Referring now to Fig. 1, the sound reproducing apparatus is housed within a casing 1 which is divided into two compartments 2 and 3 by a wall 4. The compartment 2 houses an exciter lamp 5 mounted in a lamp support 6 which is secured to the rear of the wall 4. A conductor 7 supplies current from a suitable source of supply (not shown).

A motion picture film 11, having a sound track thereon, is fed from a supply reel (not shown) into an opening 12 provided in the top of the compartment 3. The film is fed through a pair of guide rollers 13 and 14 and between a flywheel roller 15 and tension roller 16. The tension roller 16 is mounted on a film gate 23 and has a spring associated therewith (not shown) which presses it against the film passing over the flywheel roller 15. The film gate 23 is pivoted at 64 to a bracket 65 and its lower end is retractible rearwardly to facilitate threading of the film.

A spring pressed latch member 66 is provided adjacent the lower edge of the gate 23 to hold it in open or closed position. From the flywheel roller 15 the film passes down past a light aperture 17 in sound gate 23. A lens barrel 18 carrying a mechanical slit therein is placed between the aperture 17 and the exciter lamp 5 to project a narrow beam of light upon the film 11 at the sound translating point. The rollers 15 and 16 as well as the sound gate 23 are described and claimed in co-pending application Serial No. 28,846 filed June 28, 1935, it being understood that the invention is independent of the method of or means for progressing the film through the sound head but is applicable to other types of sound reproducing apparatus. From the sound gate the film passes under a continuously rotating sprocket 19 thence over a holdback sprocket 20, down over a roller 21, and onto a take-up reel (not shown). The sprockets 19 and 20 are driven by a motor in any suitable manner. A shoe 22 and a similar shoe (not shown) are mounted on the sound gate 23 to hold the film 11 in engagement with the sprocket 19. The sprocket 20 is provided with a pad roller 25.

Directly behind the sound gate 23 is provided the light cell mount or bracket 26 which constitutes the subject matter of this invention. The mount 26 is secured at its upper rear edge by screws 27 to the lower wall of a partition 28 provided in the upper right hand corner of the compartment 3.

Referring now to the remaining figures, the cell mount 26 is preferably composed of a strip of insulating material such as bakelite. A compartment 30 is provided in the mount 26 and is open at one side thereof to receive a light sensitive cell 31 (see Fig. 6) of the type described and claimed in a co-pending application of Arthur W. Carpenter and Ernest Ross, Serial No. 747,610, filed October 9, 1934. A cylindrical lens 32 is mounted in vertical position at the end of the mount 26 in front of an aperture 33 between the lens 32 and the cell 31, and diffuses the light passing through it onto the light sensitive part of the cell 31. Immediately behind the cell 31 is a pair of notches 34 and 35 in which are mounted U-shaped tensioning members such as springs 36 and 37 that serve as electrical contacts for the terminal caps 38 and 39 of the cell 31, and also serve to prevent the cell 31 from vibrating in the mount. The tensioning members or springs 36 and 37 are held in the notches 34 and 35 by an insulating extension 40 and screws 41 (see Fig. 3). The ends 42 of the springs 36 and 37 project within apertures 43 provided at the front of the extension 40 and thus limit the travel of the springs. The other ends 44 and 45 of the springs 36 and 37 are soldered or otherwise secured to conductors 44' and 45' which are threaded through a duct 72 and then through an opening 47 provided in the lower wall of the partition 28 (see Fig. 1). The ends of the conductors are connected to a terminal block 48. From the terminal block 48 the modulated current is brought through an output regulator into suitable sound amplifiers (not shown).

Referring again to the figures, the opening provided by the compartment 30 is adapted to be closed by a door 50 which is adapted to rest within a recess 51 along three sides of the compartment (see Figs. 4 and 5). In the center of the door 50 is a knurled nut 53 adapted to be threaded upon the threaded portion of an insert or stud 54 projecting from the cell mount 26 and thus secure the door 50 in position. Also attached to the door 50 as by rivets 55 is a hook 56. When it is desired to remove the cell 31 from the mount, the door 50 is removed and the hook 56 is inserted within a notch 57 provided at the side of the compartment 30 in front of the cell 31 as is shown in Fig. 4. By engaging the hooked portion 59 of the hook 56 on one of the edges 60 of the cell 31 (see Fig. 6) the cell 31 may be readily withdrawn.

Fig. 5 shows the cell holder with the door 50 removed, and with a static shield 70, which may be made of aluminum foil affixed in position and held in place by some suitable means, such as glue or shellac. Shield 70 is grounded against wall 28 of casing 1 and the leads 44' and 45' are encased by a metallic shield 71. This shielding prevents any static charge being built up on the light cell 31.

What is claimed is:

1. A mounting for a light sensitive device comprising a bracket of insulating material having an enlarged portion at one end with an opening therein, tensioning members positioned in said opening, conductors attached to said tensioning members and passing through a longitudinal opening in said bracket, and an optical element positioned in front of said bracket.

2. A mounting for a light sensitive device comprising a tapered bracket of insulating material, means on the narrow portion of said bracket for attaching said bracket to a support, an opening at the enlarged end of said insulating material for holding said light sensitive device, a pair of tensioning members for firmly holding said device in position and for making electric connections thereto, and means for closing said opening, said closing means including means for removing said device from said opening.

3. A mounting for a light sensitive device in accordance with claim 2 in which said insulating material is substantially covered with a static shield attached thereto.

4. A mounting for a photo-sensitive device which provides for the removal and replacement of said device, comprising a bracket of insulating material one end of which is adapted to be attached to a support and the other end of which is partially hollow, a projection in said hollow portion, tensioning members attached to said projection, conductors attached to said tensioning members and threaded longitudinally of said mounting, and a cover for said hollow portion, said cover having means thereon adapted to engage said device to facilitate its removal from said hollow portion.

5. In a holder for a light sensitive device, the combination of a tapered insulating support, the large terminal of which is partially hollow, a projection dividing said hollow portion into divisions, a pair of tensioning members positioned to apply tension to said light sensitive device placed in one of said divisions, and connections to the terminals of said tensioning members positioned in the other division of said hollow portion.

6. A holder for a light sensitive cell which provides means for readily inserting and replacing said cell, comprising a hollowed strip of insulating material, a pair of spring tensioning members positioned within said strip, said tensioning members adapted to make electrical connection to said light sensitive device, and a closure member for said opening said closure member having means attached thereto for removing said light sensitive device from said opening.

7. In a mounting for a light sensitive device, the combination of a strip of insulating material having an opening in one portion thereof, an optical element positioned at one end of said strip, spring tensioning means adapted to firmly hold said light sensitive device in optical registry with said optical element, means for making electrical connnections to said tensioning means, and means partially surrounding said strip for shielding said light sensitive device and the connections thereto.

8. A mounting in accordance with claim 7 in which the opening in said strip has a closure member adapted to facilitate the removal of said light sensitive device from said opening.

9. In a system for making electrical connections to a light sensitive device comprising a hollow insulating bracket, a plurality of U-shaped tensioning members adapted to tension said light sensitive device within said bracket, means for providing an initial tension on said members, and means for making electrical connections to said members within said bracket.

10. In a system for positioning a selenium cell with respect to an optical element, a holder having an opening therein, means for tensioning said cell within said opening, a lens, means at the terminal of said holder for locating said lens in a fixed position with respect to the position of said cell, and means for making electrical connections to said cell through said tensioning means.

11. A bracket for mounting a selenium cell in operative relationship in a sound reproducing system comprising a tapered insulator having a hollow portion at one terminal thereof, a lens anteriorly of said hollow portion for passing light into said hollow portion, and springs in said hollow portion adapted to firmly position said cell in optical registry with said lens.

12. A unitary mount for a lens and a light sensitive device comprising a support of insulating material having an apertured partition integral therewith, lens supporting means at one side of said partition, and means for removably supporting the light sensitive device at the other side of said partition.

13. A selenium cell mount comprising an insulating block having a transverse cell receiving aperture therein, contact terminals for the cell mounted in the wall of said aperture, and an aperture in the opposite wall of said cell receiving aperture for admitting light to the cell.

14. A selenium cell mount comprising a support of insulating material, an aperture in said support for removably receiving a selenium cell, contact terminals for the cell mounted in said support, a conduit in said support for the conductors for said terminals, and a metallic shield around said support.

PAUL HAAS.